W. R. BLOWERS.
AIR TUBE FOR PNEUMATIC TIRES.
APPLICATION FILED JULY 5, 1913.

1,083,584.

Patented Jan. 6, 1914.

Witnesses.
H. L. Trimble.
A. G. Kelly.

Inventor.
W. R. Blowers,
by H. J. S. Dennison
Atty.

UNITED STATES PATENT OFFICE.

WILLIAM R. BLOWERS, OF TORONTO, ONTARIO, CANADA.

AIR-TUBE FOR PNEUMATIC TIRES.

1,083,584.      Specification of Letters Patent.      Patented Jan. 6, 1914.

Application filed July 5, 1913. Serial No. 777,379.

*To all whom it may concern:*

Be it known that I, WILLIAM R. BLOWERS, a citizen of the United States of America, and resident of the city of Toronto, county of York, Province of Ontario, in the Dominion of Canada, have invented certain new and useful Improvements in Air-Tubes for Pneumatic Tires, described in the following specification and illustrated in the accompanying drawings, that form part of the same.

The object of the present invention is to improve that class of tire tube in which the tread portion is held under compression so that in the event of the tire being punctured the hole will close to prevent the escape of air from the tube.

The principal feature of the present invention consists in the novel construction of the tube and the method of forming the same whereby the tube is formed and molded to conform to the circular shape of the wheel and the tread portion so formed that on the inflation of the tube the said tread portion will be placed in compression and will effectively close puncture.

Figure 1:
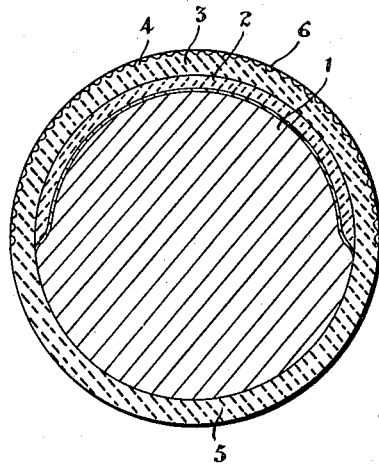
Figure 2:
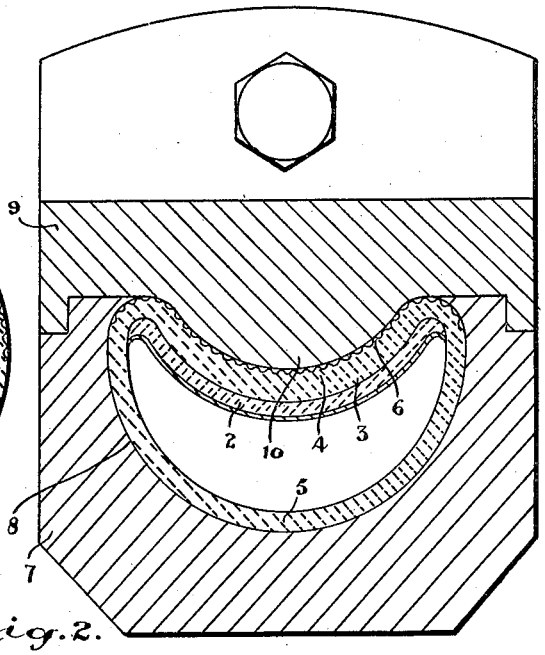
Figure 4:
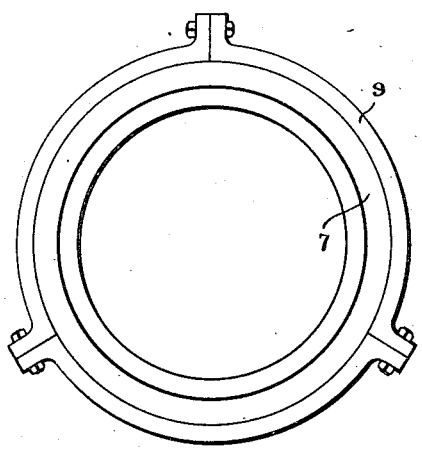
Figure 3:
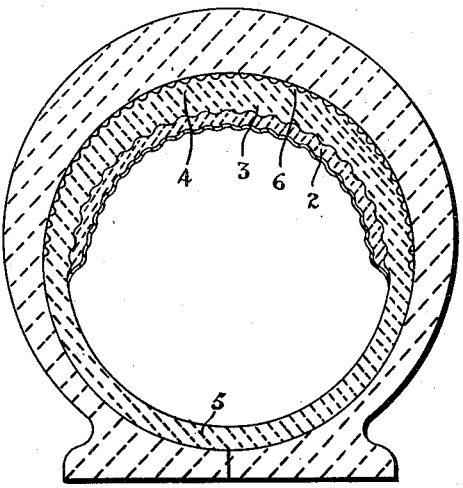

In the drawings, Figure 1 is a cross sectional view of the tube formed upon the forming core. Fig. 2 is a cross sectional view of the mold showing the shape of the tube arranged therein for vulcanizing. Fig. 3 is a cross sectional view of the tube and tire cover with the tube inflated. Fig. 4 is a reduced side elevational view of the mold for forming the tube.

Like numerals of reference indicate corresponding parts in each figure.

Referring to the drawings, 1 is a cylindrical core upon which the rubber tube is formed. In the formation of this particular form of tube a thin sheet of vulcanizing rubber or thin fabric such as stockinette is first placed around the core. A layer of raw rubber 2 or other suitable plastic material preferably of crescent shape in cross section is then laid upon the said thin sheet on the upper side of the core. The main body 3 of the tube is then built around these preliminary layers, such body being formed of rubber containing a suitable proportion of vulcanizing material.

The tube 3 is formed with the tread portion 4 of greater thickness than the inner side 5, the thickened portion gradually tapering off to the thinner side. After the tube is thus built up a strip of suitable fabric 6 is impregnated with rubber and laid upon the outer surface of the tread portion 4 of the tube, said fabric extending about half way around said outer surface. When the tube is thus formed it is removed from the core 1 and the ends are then brought together and lapped in the usual manner. The tube is then placed in a circular mold 7 having the peripheral face 8 of corresponding radius in cross section to the outer radius of the tube.

The tube is first slightly inflated and the tread portion is pressed inwardly and the cap sections 9 of the mold are placed in position encircling the outer periphery of the tube and securely clamped. The cap sections are formed in cross section with an inwardly projecting portion 10 which presses the tread 4 of the tube inwardly as shown in Fig. 2. The mold is then heated in the usual manner for vulcanizing or treating the rubber and the tube when removed from the mold is in the shape shown in Fig. 2, the tread portion 4 thereof being depressed or indented completely around its periphery and in a natural state of equal pressures. When the tube thus formed is placed within the tire casing 11 and inflated the outward pressure of the air forces the indented tread portion outwardly to fill up the circular cross sectional shape of the said casing and as the fabric sheath on the outer surface of the tread portion of the tube prevents the rubber in said tread portion from expanding laterally the material in said tread portion will be compressed by the reversal of the arc shape. The inner layer of raw rubber which is not affected by the vulcanizing process is also placed in compression.

In the event of the tire being punctured the compressed rubber of the tread will squeeze the hole together to retain the air pressure and the inner layer of raw rubber which is soft and pliable will be forced into the hole making a perfect seal. This inner layer of raw rubber or other plastic material is a very important feature as it obviates the possibility of leakage of air from the tire in the event of the vehicle stopping and resting upon a sharp projection such as a rock or a stick in the road.

The compressed rubber of the tread portion will under ordinary conditions retain the air without leakage but if the tire is depressed or indented from the outside by resting upon a stone or other small, raised surface the indenture may cause the portion of the tire immediately thereover to be stretched instead of remaining under compression and under such conditions the soft unvulcanizing material, covering the inner tread portion of the tire, will flow into and effectively plug the hole.

Another important feature in the formation of the present tire is in the forming of the tube into the circle formation and vulcanizing it in that form with the tread portion depressed so that the tube will lie within the cover without distortion and so that the inflating of the said tube will cause the compression of the tread portion.

The thin inner layer of vulcanizing rubber or light fabric is provided so that the raw rubber or plastic material will not adhere to the other portions of the tire in the event of the tube becoming deflated.

What I claim as my invention is:—

1. An annular tube formed with a thickened tread portion on its outer periphery and molded with said tread portion normally depressed, and a strip of plastic material covering the inner surface of said depressed tread portion, said tread and plastic inner covering being compressed transversely on the inflation of the tire.

2. An annular tube formed with a thickened tread portion on its outer periphery and molded with said tread portion normally depressed, an annular strip of plastic material covering the inner surface of said depressed tread portion, and a strip of fabric covering the inner surface of said plastic material and adapted to hold said plastic material from displacement, said tread and plastic material being compressed laterally on the inflation of the tire.

Signed at the city of Toronto, Ontario, Canada, this 27th day of June, 1913.

WILLIAM R. BLOWERS.

Witnesses:
E. HERON,
A. G. KELLY.